US012577054B2

(12) United States Patent
Kanaris

(10) Patent No.: US 12,577,054 B2
(45) Date of Patent: Mar. 17, 2026

(54) CONVEYOR DRIVE ROLLER WITH PRESSURE RELIEF MEANS

(71) Applicant: Van der Graaf Inc., Brampton (CA)

(72) Inventor: Alexander D. Kanaris, Richmond Hill (CA)

(73) Assignee: Van der Graaf, Inc., Brampton (CA)

( * ) Notice: Subject to any disclaimer, the term of this patent is extended or adjusted under 35 U.S.C. 154(b) by 196 days.

(21) Appl. No.: 18/205,853

(22) Filed: Jun. 5, 2023

(65) Prior Publication Data

US 2024/0246768 A1    Jul. 25, 2024

(30) Foreign Application Priority Data

Jan. 23, 2023    (CA) ...................................... 3187367

(51) Int. Cl.
| | |
|---|---|
| *B65G 23/08* | (2006.01) |
| *B65G 23/24* | (2006.01) |
| *F16H 57/02* | (2012.01) |
| *F16H 57/027* | (2012.01) |

(52) U.S. Cl.
CPC ............. *B65G 23/08* (2013.01); *B65G 23/24* (2013.01); *F16H 57/027* (2013.01); *F16H 2057/02034* (2013.01); *F16H 2057/02069* (2013.01)

(58) Field of Classification Search
None
See application file for complete search history.

(56) References Cited

U.S. PATENT DOCUMENTS

| | | | |
|---|---|---|---|
| 2,986,267 A | 5/1961 | Carlson | |
| 3,224,289 A | 12/1965 | Palm | |
| 4,007,826 A | 2/1977 | Brown | |
| 4,013,166 A | 3/1977 | Weady | |
| 4,071,040 A * | 1/1978 | Moriarty ................ | H04M 1/03 |
| | | | 379/451 |
| 6,443,295 B1 | 9/2002 | Hill | |
| 6,766,900 B2 | 7/2004 | Kanaris | |
| 6,837,364 B2 | 1/2005 | Kanaris | |
| 7,510,073 B2 | 3/2009 | Kanaris | |
| 7,806,252 B2 | 10/2010 | Kanaris | |

(Continued)

FOREIGN PATENT DOCUMENTS

| | | |
|---|---|---|
| CN | 201186811 | 1/2009 |
| CN | 114194725 | 3/2022 |
| EP | 2741985 | 6/2014 |

OTHER PUBLICATIONS

Bimed Teknik. Cable Glands & Accessories for Industrial Hazardous Applications. Product Catalog Feb. 2018, "Ventilation plug for Ex e applications" pp. 198-199, published 2018.

(Continued)

*Primary Examiner* — William R Harp

(57) ABSTRACT

A conveyor drive roller for a conveyor system. The conveyor drive roller has a hollow drum rotatably connected to a first stationary shaft and a second stationary shaft, and defines a sealed chamber. The chamber at least partially encloses means to rotate the hollow drum about the first and second stationary shafts. A pressure relief valve is positioned on the conveyor drive roller in fluid communication with the inside of the chamber. The pressure relief valve is configured to reduce a gas pressure increase inside of the chamber caused by a rise in a temperature of the conveyor drive roller during operation.

16 Claims, 2 Drawing Sheets

(56)     References Cited

U.S. PATENT DOCUMENTS

| | | | |
|---|---|---|---|
| 8,006,829 | B2 | 8/2011 | Itoh |
| 8,292,064 | B2 | 10/2012 | Kanaris |
| RE44,907 | E | 5/2014 | Kanaris |
| RE44,919 | E | 6/2014 | Kanaris |
| 9,284,131 | B2 | 3/2016 | Kanaris |
| 10,093,487 | B2 | 10/2018 | Ramezani |
| 10,301,118 | B2 | 5/2019 | Tiedemann |
| 10,562,711 | B2 | 2/2020 | Van Holthe Tot Echten |
| 11,377,301 | B2 | 7/2022 | Hampe |

OTHER PUBLICATIONS

Bimed Teknik. Cable Glands & Accessories for Industrial Hazard-ous Applications. Product Catalog Feb. 2018, "Ventilation Plugs Metal" pp. 78-79, published 2018.

* cited by examiner

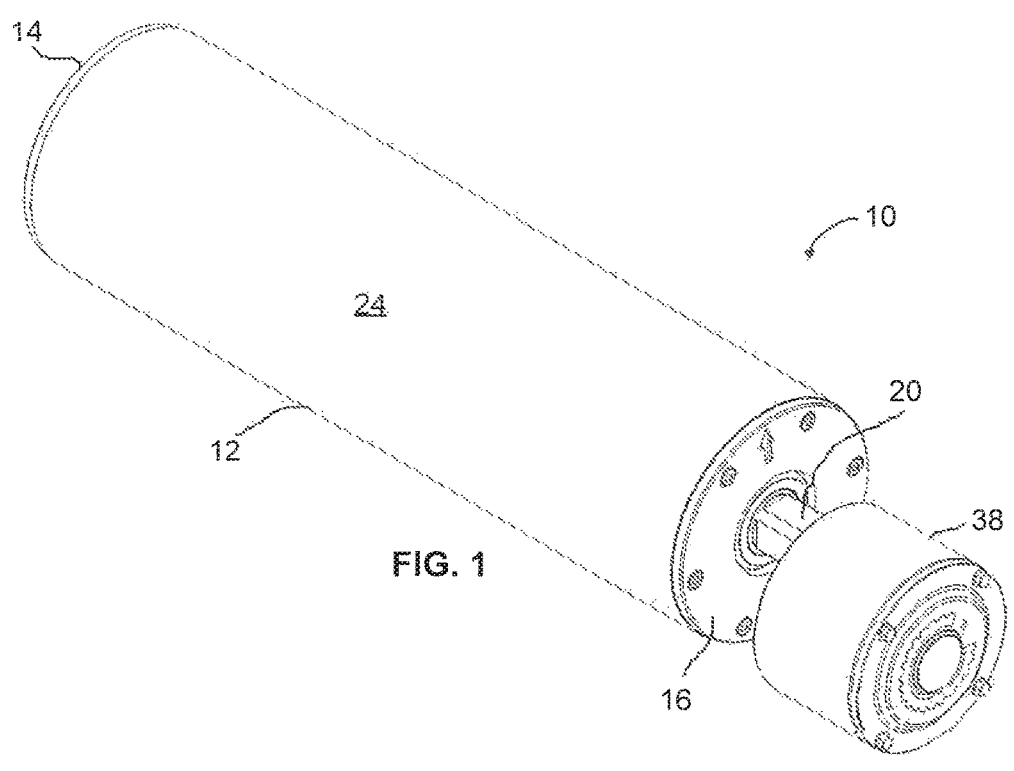
FIG. 1
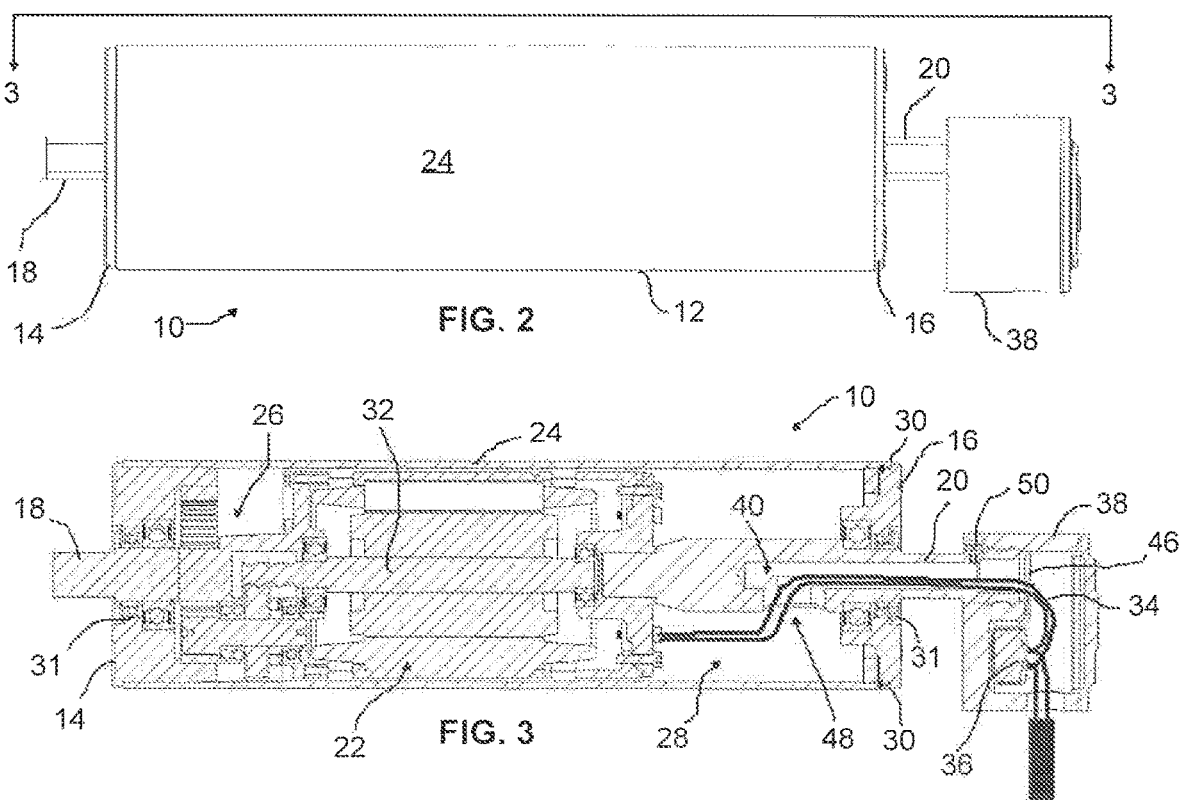
FIG. 2
FIG. 3

CONVEYOR DRIVE ROLLER WITH PRESSURE RELIEF MEANS

FIELD OF THE INVENTION

The present invention relates generally to conveyor systems. More particularly, the present invention relates to conveyor drive rollers for driving conveyor belts.

BACKGROUND OF THE INVENTION

Conveyor systems are found in a wide variety of industries, as they are an important part of materials handling. A wide variety of conveyor systems have been developed for use in reliably, and efficiently transporting various items from one location to another location. By way of example, conveyor systems are used to move sand, gravel, crushed ore or rock, coal, and other materials, depending upon the particular industry involved. A large variety of known conveyor systems comprise a continuous belt or conveyor medium which travels over a series of conveyor rollers.

Typically, such conveyor systems utilized at least one conveyor drive roller which has a roller surface that is caused to rotate by an electric, hydraulic, or pneumatic motor positioned inside or outside of the conveyor drive roller. The conveyor drive roller translates the rotational movement of the roller surface to linear movement of the conveyor medium. In addition to one or more conveyor drive rollers, the conveyor system may include one or more conveyor idler rollers, which are not driven, and merely serve to support the conveyor medium as it moves thereover driven by the one or more conveyor drive rollers in the conveyor system.

Improvements in conveyor systems have led to the development of motorized conveyor drive rollers, such as for example the motorized conveyor pulley disclosed in U.S. Pat. No. 6,443,295 to Hill. The motorized conveyor pulley disclosed by Hill was of the type comprising a cylindrical pulley drum with axially opposite end plates enclosing an electric motor and drive transmission, the pair of end plates of the pulley being supported on a pair of shaft ends by pairs of bearings and sealed by a pair of lubricant seals between each pair of bearings.

Other examples of prior conveyor drive rollers with internal electric motors and transmissions include those disclosed in U.S. Pat. Nos. 6,766,900, 6,837,364, 7,510,073, 7,806,252, 8,292,064, RE44,919, RE44,907, and 9,284,131, all to Kanaris.

However, one problem with prior conveyor drive rollers is that during operation, friction acting on the components moving and interacting inside of the conveyor drive rollers causes the conveyor drive rollers to heat up. Friction acting between the surface of the conveyor drive rollers and their conveyor belts also adds to this buildup of heat to some extent. Since the insides of prior conveyor drive rollers are sealed from the outside environment, the buildup of heat causes the pressure inside of the conveyor drive rollers to rise relative to ambient pressure outside of the conveyor drive rollers. Furthermore, increasing pressures contributes to a further increase in heat, in a positive feedback loop. The pressure inside of such prior art conveyor drive rollers can rise up to 7 pounds per square inch (PSI) or more, and the internal temperatures can climb to 100° C. or more. These internal pressures and temperatures are not insignificant. Ideally the pressure inside of a conveyor drive roller is 0 PSI, and not more than about 1 PSI. The ideal temperature inside of a conveyor drive roller is between about 50° C. and 70° C.

By design, the insides of prior conveyor drive rollers are sealed from the outside environment to prevent dirt, dust, and other foreign debris from entering the inside of the conveyor drive rollers, as doing so has been found to increase their service lives. However, a pressure differential between the inside of a conveyor drive roller, and the outside environment, caused by a buildup of heat during its operation, puts strain on those seals, which can lead to premature failure of the conveyor drive roller should a seal fail.

For example, a worn, ruptured, or displaced seal (i.e. rolled lip) can cause internal liquid lubricant to seep out of the conveyor drive roller, and/or dirt, dust, and other foreign debris to enter the inside of the conveyor drive roller. Both of these undesirable outcomes will increase the friction acting on internal components of the conveyor drive roller, causing them to wear, and eventually fail. Failure of one or more internal components in this manner will lead to a failure of the conveyor drive roller itself.

Furthermore, the increased internal friction will tend to further increase the temperature of the conveyor drive roller, and accelerate its failure. Overheating is the most common failure mechanism for an electric motor, and can lead to a) failure of the winding-isolation, which results in a short-circuit and possibly burnout of the motor, b) failure of the bearings, resulting in a jammed motor, c) degradation of the magnets, leading to reduced performance, and d) degradation of seals, causing them to dry out and crack, or become brittle.

Overheating can also cause the internal liquid lubricant to begin to degrade and lose its viscosity, resulting in further damage to the internal components of the conveyor drive roller, and accelerating its eventual failure.

Whatever the failure mode of the conveyor drive roller, the result is costly repairs and down time to get the conveyor system back online.

Therefore, there is a continuing need for improvements in conveyor drive rollers.

SUMMARY OF THE INVENTION

What is desired is a conveyor drive roller that overcomes at least some of the problems with prior art conveyor drive rollers.

In particular, what is desired is a means for relieving an increase in pressure inside of a conveyor drive roller caused by a rise in the temperature of the conveyor drive roller during operation.

The present invention is directed to a conveyor drive roller with a pressure relief valve configured to reduce a gas pressure increase inside of the conveyor drive roller caused by a rise in the temperature of the conveyor drive roller during operation.

Therefore, in accordance with one aspect of the present invention, there is disclosed a conveyor drive roller for a conveyor system, said conveyor drive roller comprising:

a hollow drum rotatably connected to a first stationary shaft and a second stationary shaft, said hollow drum defining a sealed chamber;

said sealed chamber at least partially enclosing means to rotate said hollow drum about said first and second stationary shafts; and a pressure relief valve positioned on said conveyor drive roller in fluid communication with said inside of said sealed chamber, and configured to reduce a gas pressure increase inside of said sealed chamber caused by a rise in a temperature of said conveyor drive roller during operation.

In accordance with another aspect of the present invention, there is disclosed a use of a pressure relief valve in a conveyor drive roller of the type comprising a hollow drum rotatably connected to a first stationary shaft and a second stationary shaft, said hollow drum defining a sealed chamber at least partially enclosing means to rotate said hollow drum about said first and second stationary shafts;

wherein said pressure relief valve is positioned on said conveyor drive roller in fluid communication with said inside of said sealed chamber, and configured to reduce a gas pressure increase inside of said sealed chamber caused by a rise in a temperature of said conveyor drive roller during operation.

BRIEF DESCRIPTION OF THE DRAWINGS

Reference will now be made to the preferred embodiments of the present invention with reference, by way of example only, to the following drawings in which:

FIG. 1 is a perspective view of a conveyor drive roller, according to an embodiment of the present invention;

FIG. 2 is a front view of the conveyor drive roller of FIG. 1;

FIG. 3 is a cross-sectional view of the conveyor drive roller of FIG. 1 taken along line 3-3 of FIG. 2;

DETAILED DESCRIPTION OF THE PREFERRED EMBODIMENTS

Figures 4, 5:
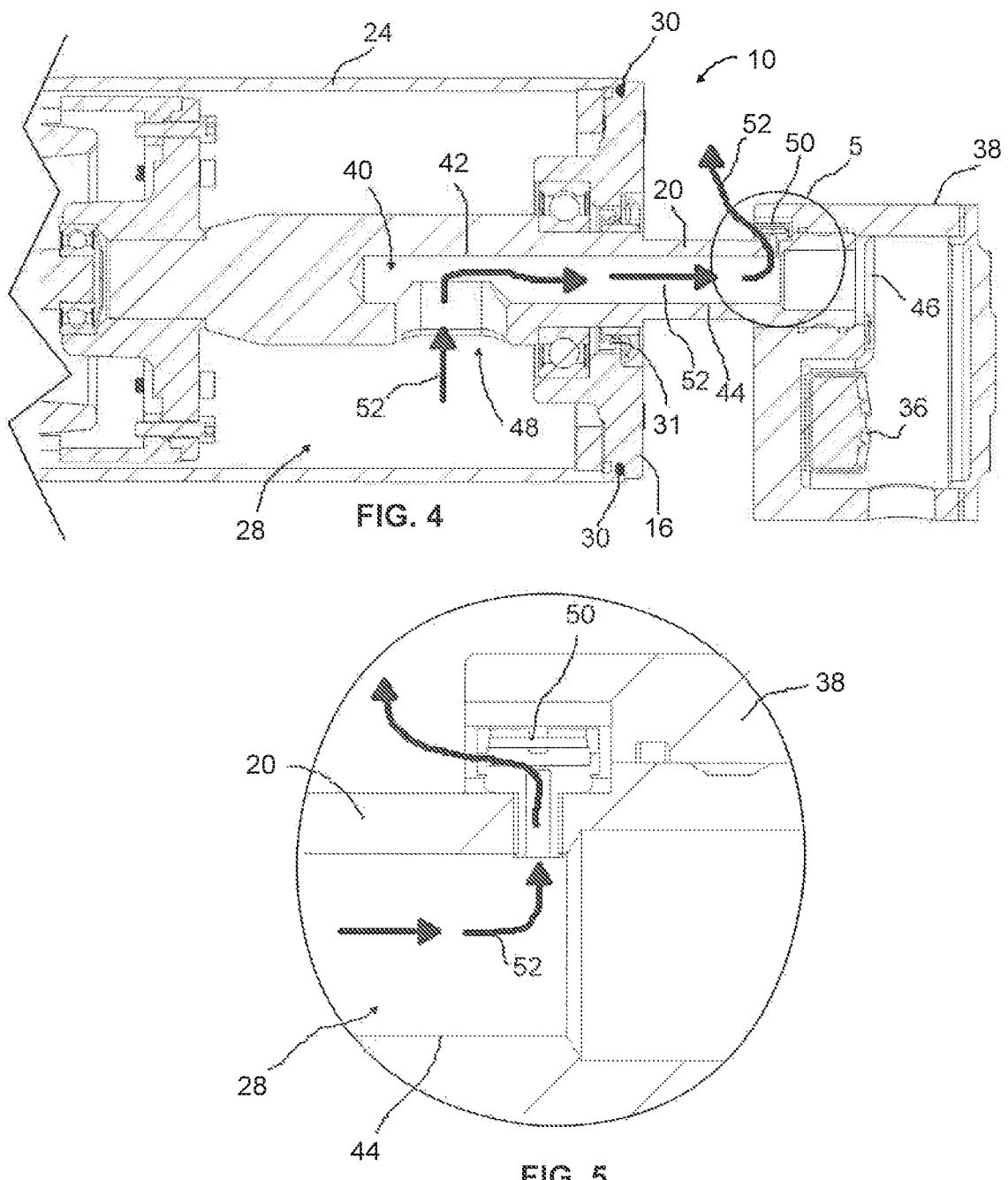
FIG. 4 is an enlarged view of a section of FIG. 3, with electrical wires removed to aid illustration.
FIG. 5 is an enlarged view of FIG. 4.

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein. In the figures, like elements are given like reference numbers. For the purposes of clarity, not every component is labelled in every figure, nor is every component of each embodiment of the invention shown where illustration is not necessary to allow those of ordinary skill in the art to understand the invention. Orientative words such as, for example, "top", "bottom", "front", "left", and "right", as used herein are used for clarity with reference to the orientation of certain elements in the figures and are not intended to be limiting.

FIGS. 1 and 2 respectively show a perspective view and a front view of a conveyor drive roller 10 according to an embodiment of the present invention. The conveyor drive roller 10 consists of a hollow cylindrical drum 12, having end flanges 14, 16. Stationary shafts 18, 20 extend through respective end flanges 14, 16.

As best seen in the cross-sectional view shown in FIG. 3, each of the stationary shafts 18, 20 is disposed internally of the hollow drum 12 for carrying a means to rotate the hollow drum 12 about the stationary shafts 18, 20. In this example, the means to rotate the hollow drum 12 consists of an electric motor 22 (AC or DC) coupled to a gear assembly 26, between the stationary shafts 18, 20.

The exterior portions of the stationary shafts 18, 20 may preferably have cross-sections which permit them to be secured to a frame of a conveyor system (not shown). For example, shaft holders or the like that will register with the exterior portions of the stationary shafts 18, 20 can be used for positive securement of the conveyor drive roller 10 to the frame of the conveyor system (not shown). As best seen in FIGS. 1 and 2, the exterior portions of stationary shafts 18, 20 present a generally square cross-section so as to prevent rotation of the stationary shafts 18, 20, when secured to the frame of the conveyor system (not shown). What is important is that the stationary shafts 18, 20 are configured for mounting on a suitable support or frame work, and secured to the support or frame work, all of which is known in the art and requires no detailed description. Preferably, the stationary shafts 18, 20 may be releasably secured to the support or frame work with, for example, blocks or clamps attached to the frame of the conveyor system (not shown).

The outer surface 24 of the hollow drum 12 is preferably adapted to move a conveyor medium (not shown), such as a belt or flexible strip of any suitable material, or a matrix of chain links, or the like, in a known manner. In a typical application, the conveyor medium (not shown) will run around the outer surface 24 of the hollow drum 12, and be driven by the hollow drum 12, which rotates about stationary shafts 18, 20. Such a conveyor medium (not shown) may also run over additional conveyor drive rollers 12 and/or conveyor idler rollers (not shown). Furthermore, the outer surface 24 may include any variety of means to increase the co-efficient of friction between the outer surface 24 and the conveyor medium (not shown) for better grip, such as for example by knurling or machining a spiral at each end toward the center or by covering the outer surface 24 with lagging made from rubber or a rubber-like material.

However, it is contemplated that for some applications, conveyor systems may be designed to operate without a conveyor medium, relying instead on a plurality of conveyor drive rollers 10 positioned in series to move material from one place to another supported directly on top of their outer surfaces 24. All such embodiments are comprehended by the present invention.

Referring now to FIG. 3, the conveyor drive roller 10 is similar to prior art conveyor drive rollers, such as for example, the motorized conveyor pulley disclosed in U.S. Pat. No. 6,443,295 to Hill, or the one disclosed in U.S. Pat. No. 6,837,364 to Kanaris, and therefore it is not necessary to get into the details of how to "motorize" the conveyor drive roller 10 according to embodiments of the present invention. Suffice it to say that the conveyor drive roller 10 has first and second stationary shafts 18, 20 for attachment to the frame of a conveyor system (not shown), and a hollow drum 12 which is rotatably connected to the stationary shafts 18, 20. Furthermore, the hollow drum 12 defines a sealed chamber 28, which preferably encloses a means to rotate the hollow drum 12 about the first and second stationary shafts 18, 20. Preferably the sealed chamber 28 is partly filled with a liquid lubricant (not shown), such as gear oil, ensuring proper lubrication and cooling during operation of the conveyor drive roller 10, as is known in the art.

Preferably, sealed chamber 28 is sealed from the outside environment by using seals in a known manner. By way of example, a compressible rubber O-ring seal 30 is shown in FIG. 3, between the right end flange 16 and the hollow drum 12, and rotary shaft seals 31 are shown between the left and right end flanges 14, 16, and the respective stationary shafts 18, 20. Preferably, the O-ring seal 30 may be retained in an annular groove on the right end flange 16. The O-ring seal 30 is provided at this location because the right end flange 16 is removable from the hollow drum 12 in this example. The left end flange 14 is not removable from the hollow drum 12. Instead, the left end flange 14 is press fit into the hollow drum 12, forming a mechanical bond therebetween which is also liquid tight (to prevent liquid lubricant from seeping out of the sealed chamber 28), and airtight. A retaining compound may be used between the mating surfaces of the left end flange 14 and the hollow drum 12 to increase the strength of the mechanical bond and better ensure a liquid/airtight seal.

Additionally, rotary shaft seals 31 may be used to seal the sealed chamber 28. As best seen in FIG. 4, a rotary shaft seal 31 is retained by the right end flange 16, to seal a gap between the right end flange 16 and the second stationary shaft 20, in a known manner. As shown in FIG. 3, a second rotary shaft seal 31 is retained by the left end flange 14 to seal a gap between the left end flange 14 and the first stationary shaft 18, also in a known manner. Rotary shaft seals 31 have a single or double lip on their inner surface that contacts the stationary shaft to provide the sealing action.

Typical seals are made from rubber, or rubber like materials, such as nitrile, urethane, and fluoroelastomers, paper, and cork. Exposing such seals to high heat and high pressure cycles during operation of a conventional conveyor drive rollers decreases the service life of seals, and can lead to their premature failure, in turn causing premature failure of the conveyor drive roller itself.

During operation of a conventional conveyor drive roller, heat builds up inside of the sealed chamber 28, which causes pressure to also build up inside of the sealed chamber 28. However, the increasing pressure, also causes the temperature to increase even more, since the pressure law states that for a constant volume of gas in a sealed container the temperature of the gas is directly proportional to its pressure.

Seals are generally susceptible to failure from high heat causing them to drying out, crack, become brittle, or become more susceptible to wear. Seals can also fail from high pressure causing them to blow out or rupture (in the case of an O-ring or gasket type seal, for example), or blow out or roll a lip (in the case of a rotary shaft seal for example). Failed seals allow liquid lubricant to leak or seep out of the conveyor drive roller, and dirt, dust, and other foreign debris to enter inside of the conveyor drive roller. Both of these outcomes have negative consequences for conveyor drive rollers. For this reason, it is desirable to avoid high temperatures and pressures inside conveyor drive rollers, as doing so is expected to increase the length of their time in service.

The means to rotate the hollow drum 12 preferably includes an electric motor 22 and an internal gear assembly 24, operatively connected to the hollow drum 12. Thus, when energized by electricity, the rotor 32 of electric motor 22 spins, which in turn rotates gears of the internal gear assembly 24, which in turn cause the hollow drum 12 to rotate about stationary shafts 18, 20. Preferably, the electric motor 22 may be energized with electrical wiring 34 having one end electrically connected to the electric motor 22, and the other end electrically connected to electrical terminals 36 enclosed in an electrical housing 38, as shown in FIG. 3. Preferably, the electrical wiring 34 may be routed from the electrical housing 38 to the electric motor 22 through a conduit 40 formed in one of the first and second stationary shafts 20. In this example, the conduit 40 is shown formed in the second stationary shaft 20. Preferably, therefore, the conduit 40 may be sized and shaped to accommodate the electrical wiring 34 so that the electrical wiring 34 may be routed therethrough for powering the electric motor 22. That said, the conduit 40 will preferably be configured to also serve another purpose, as a pathway for pressurized gas to exit the sealed chamber 28, which will be described in more detail below. In most cases the pressurized gas inside of the sealed chamber 28 will be air, however, it is contemplated that in some embodiments the pressurized gas inside of the sealed chamber 28 may be substantially a single gas, such as nitrogen for example, or a combination of more than one different gases, wherein the combination is different from air.

As best seen in FIG. 4, the conduit 40 extends from the inside of the sealed chamber 28 to the outside of the sealed chamber 28. Furthermore, the conduit 40 defines an internal portion 42 located inside of the sealed chamber 28, and an external portion 44 located outside of the sealed chamber 28. The external portion 44 is preferably sealed from the outside of the chamber 28 to prevent liquid lubricant (not shown) inside the sealed chamber 28 from leaking or seeping out of the sealed chamber 28, and dirt, dust, and other foreign debris from entering into the sealed chamber 28, both of which are undesirable outcomes. Accordingly, a sealing end cap 46 is preferably used to seal the conduit 40 around the electrical wiring 34 in the external portion 44. It will be appreciated that the sealing end cap 46 will need to be adapted to handle the maximum gas pressure expected inside of the sealed chamber 28. By way of example, the sealing end cap 46 may be a form of a rubber plug.

With continued reference to FIG. 4, the internal portion 42 of the conduit 40 defines an opening 48 in fluid communication with the inside of the sealed chamber 28. The opening 48 is preferably sized and shaped to allow the electrical wiring 34 to pass therethrough from the conduit 40, and into the sealed chamber 28, on its path from the electrical housing 38 to the electric motor 22. Furthermore, the opening 48 will preferably be sized and shaped to serve as a pathway for pressurized gas to exit the sealed chamber 28, as mentioned above, and described in more detail below.

Although, the electric motor 22 is shown in this example as being positioned inside of the sealed chamber 28, it is contemplated that in some embodiments, the electric motor 22 may be positioned outside of the sealed chamber 28, such as for example in the conveyor drive roller disclosed in U.S. Pat. Nos. 7,806,252, 8,292,064, RE44,907 and RE44,919 all to Kanaris. Furthermore, it is contemplated that means to rotate the hollow drum 12 other than an electric motor may be used, such as for example, a hydraulic motor (not shown), whether positioned inside of the sealed chamber 28, or outside. All such embodiments are comprehended by the present invention.

Referring now to FIGS. 4 and 5, a pressure relief means is shown attached to the second stationary shaft 20. Preferably, the pressure relief means may be in the form of a pressure relief valve 50 sealingly connected to the external portion 44 of the conduit 40. Preferably, the pressure relief valve 50 may be concealed within a compartment of the electrical housing 38, as best seen in FIG. 5. What is important is that the pressure relief valve 50 is positioned on the conveyor drive roller 10 in fluid communication with the inside of the sealed chamber 28, and configured to reduce a gas pressure increase inside of the sealed chamber 28 caused by a rise in the temperature of the conveyor drive roller 10 during operation.

According to a preferred embodiment of the invention, the pressure relief valve 50 is in fluid communication with the inside of the sealed chamber 28 via the conduit 40, which extends from the inside of the sealed chamber 28 to outside of the sealed chamber 28. The conduit 40 has an opening 48 in the internal portion 42, and the external portion 44 is preferably closed off with a sealing end cap 46. The conduit 40 together with the pressure relief valve 50 provide a fluid flow path 52 for pressurized gas to exit from the inside of the sealed chamber 28 to outside of the sealed chamber 28, thereby reducing an increase in gas pressure that may have developed inside of the sealed chamber 28 caused by a rise in the temperature of the conveyor drive roller 10 during operation. In this example, the fluid flow path 52 is shown passing from the inside of the sealed chamber 28 into the conduit 40 through the opening 48, along conduit 40 to the pressure relief valve 50, and then to outside of the sealed chamber 28 through the pressure relief valve 50. The electrical wires 34 that would normally pass through the conduit 40, which are shown in FIG. 3, are not shown in FIGS. 4 and 5 to more clearly show the fluid flow path 52.

Preferably, the conduit 40 is formed entirely in the second stationary shaft 20, as also illustrated by this example. However, it is contemplated that the conduit 40 may be positioned only partially inside of the second stationary shaft 20, for example with the use of additional piping (not shown) that passes only partially through the second stationary shaft 20. Moreover, the conduit 40 may even be positioned in the first stationary shaft 18, according to other embodiments of the invention. All such embodiments are comprehended by the present invention. What is important is that the pressure relief valve 50 is positioned on the conveyor drive roller 10 and configured to allow pressurized gas to pass from inside of the sealed chamber 28 to outside of the sealed chamber 28, while preferably blocking liquids and particulate solids from passing from outside of the sealed chamber 28 to the inside of the sealed chamber 28. The best location for the pressure relief valve 50 has been found to be on the second stationary shaft 20, as noted above.

The pressure relief valve 50 may be a mechanical valve of the type having a closing member, such as a diaphragm, a piston, or plunger for example, biased to block an opening through the valve body, for example with a spring, and configured to unblock the opening at a predetermined pressure differential. Alternately the pressure relief valve 50 may be a simple plug with a membrane configured to relieve air pressure outwardly through the membrane, or both outwardly and inwardly through the membrane. Preferably, the membrane may be further configured to block liquids, such as oil (i.e. oleophobic) and water (i.e. hydrophobic), and particulate solids from passing therethrough. All such embodiments are comprehended by the present invention.

An example of such a pressure relief valve 50 would be a one-way valve, which opens at a predetermined gas pressure to allow the pressurized gas to flow through. Such a pressure relief valve 50 would allow an increase in gas pressure inside of the sealed chamber 28 pressure to equalize with the ambient air pressure outside of the sealed chamber 28, as the conveyor drive roller 10 warms up during operation, by expelling the pressurized gas outside of the sealed chamber 28 through the pressure relief valve 50, thereby avoiding a buildup of high gas pressure inside of the sealed chamber 28 that may be sufficient to damage the seals 30, 31, and other components of the conveyor drive roller 10 that may be sensitive to high gas pressure.

One potential downside of using such a one-way valve for a pressure relief valve 50 is that when the temperature of the conveyor drive roller 10 is reduced, for example by turning off the conveyor drive roller 10, or operating the conveyor drive roller 10 at a reduced speed, or even operating the conveyor drive roller 10 with a reduced load, the gas pressure inside of the sealed chamber 28 will also decrease. In this case the decreased gas pressure inside of the sealed chamber 28 will be a negative pressure. Although a negative pressure acting on the seals 30, 31 is not ideal, and may eventually lead to premature failure if allowed to persist for a long time, this condition is less problematic than a positive gas pressure inside of the sealed chamber 28. It is also important to note that conveyor drive rollers 10 do not experience a lot of downtime in the field, and can be expected to operate primarily at the same increased temperature for most of their lifespans, thereby avoiding significant negative gas pressures for any significant periods.

That said, more preferred embodiments may be provided with a pressure relief valve 50 of a type which is further configured to allow gas to also pass from the outside of the sealed chamber 28 to the inside of the sealed chamber 28, along the flow path 52, but in reverse, while preferably also blocking liquids and particulate solids from passing from outside of the sealed chamber 28 to the inside of the sealed chamber 28. Such a pressure relief valve 50 is better known as a pressure equalization valve, or a pressure equalization plug (PEP). The main function of a pressure equalization plug is to balance the pressure between the inside and outside of an enclosure. In other words, a pressure equalization valve or port is preferably used to maintain a differential pressure ($\Delta$P) of 0 PSI (ideally), and no greater than 1 PSI, between inner and outer atmospheres of an enclosure. Thus, the selected pressure relief valve 50 may preferably be one which is configured to maintain the gas pressure in the inside of the sealed chamber 28 in a range from −1 PSI to 1 PSI, relative to the outside of the sealed chamber 28. More preferably, the selected pressure relief valve 50 may be one configured to maintain the gas pressure in the inside of the sealed chamber 28 in a range from 0 PSI to 0.6 PSI. Most preferably, the selected pressure relief valve 50 will maintain the pressure differential between the inside and outside of the sealed chamber 28 at 0 PSI.

In this regard, good results have been obtained using Hydra™ Ventilation Plugs, sourced from Bimed Industrial Inc. (Toronto, Ontario, Canada), as pressure relief valves 50. In particular, Part Number SBBVP-X01L, yielded good results in a 746 watt conveyor drive roller 10 having a 12.7 cm diameter by 35.0 cm wide a cylindrical drum 12, driven by an internal 480 volt electric motor, wherein a maximum pressure of 0.6 PSI was measured inside of the sealed chamber 28, during operation. Larger, 16.0 cm and 21.5 cm diameter conveyor drive rollers 10 were also tested with good results being obtained with the model SBBVP-X01L PEP from Bimed Industrial Inc., in both cases.

The Hydra™ Ventilation Plugs have a membrane that is hydrophobic, and oleophobic. The model SBBVP-X01L PEP from Bimed Industrial Inc. has a body made from stainless steel 316L, and a vent membrane made from acrylic copolymer on nylon support. The membrane is hydrophobic, and oleophobic. The Bimed PEP provides an ingress protection rating of IP66/IP68. It has an outer thread size (male) M12×1.5, an average AFR of 16 l/h (Air Flow Rate $\Delta$P=70/1 PSI), a water intrusion pressure of 0.9 bar, an outer diameter of 18.8 mm, and a height of 28.8 mm. However, the present invention is not limited to Hydra™ Ventilation Plugs. It is contemplated that other types of pressure relief valves 50, including ones sourced from other manufacturers, may be used in other embodiments. For example, good results were also obtained using a PEP model No. BX-MOSM4X0.7 sourced from Huizhou Baoxin Technology Co., Ltd (Guangdong, China). All such embodiments of comprehended by the present invention.

The model BX-MOSM4X0.7 PEP from Huizhou Baoxin Technology Co., Ltd has a body made from stainless steel 304, and provides an ingress protection rating of IP68. It has an average AFR of 12.6 l/h (Air Flow Rate $\Delta P$=70/1 PSI), and a water intrusion pressure of 0.8 bar.

There are generally two parameters, which define the performance of a PEP. They are the Air Flow Rate (AFR), and the Water Intrusion Pressure (WIP). Both parameters depend on each other and are functions of the particular membrane used in the PEP, as well as of the design of the PEP incorporating the membrane. A preferred PEP for use in embodiments of the present invention will have a high AFR, and the highest possible WIP. Generally, the AFR is determined at a differential pressure of $\Delta P$=70 mbar, which is equal to 1 PSI. Because most specifications of PEPs disclosed by manufacturers are based on a differential pressure of $\Delta P$=70 mbar it is possible to compare the properties of the different PEPs when determining which PEP to select for incorporation into a particular conveyor drive roller 10.

An increase in the AFR, correlates to a decrease in the WIP, when using the same type of PEP. In other words, the WIP is lower for PEPs with higher AFRs. As a result, the WIP limits the International Protection (IP) rate of an enclosure when a PEP is used. Preferably, this fact may be taken into account when designing a conveyor drive roller 10, so that the differential pressure ($\Delta P$) will not exceed the WIP value, at least not while the conveyor drive roller 10 is allowed to cool down (i.e. after switching off the system), since water could be sucked into the sealed chamber 28, through the pressure relief valve 50, mixed in with the outside air.

With respect to the AFR, what is important that it is sufficiently high to allow a buildup of gas pressure inside of the sealed chamber 28 to be relieved quickly enough to avoid prolonged exposure of the seals 30, 31 to the high pressure thereby limiting the potential for damage. For greater certainty, the present invention is not limited to a pressure relief valve 50 with a particular AFR. However, it is contemplated that an AFR of 1 l/h (Air Flow Rate $\Delta P$=70/1 PSI) or greater will be sufficient for most applications. While there a higher AFR is best, and there is no upper limit to acceptable AFRs, the lower AFR limit should be high enough to relieve a high-pressure condition as quickly as possible (preferably within a 24 hour period, more preferably within a 1 hour period, and most preferably within a 1 minute period).

Having described the invention in detail above, it will be understood that a pressure relief valve 50 may be used in a conveyor drive roller 10 of the type having a hollow drum rotatably connected to first and second stationary shafts, and defining a sealed chamber at least partially enclosing means to rotate the hollow drum, in order to reduce gas pressure inside of the sealed chamber which may have built up due to a rise in the temperature of the conveyor drive roller during operation. Although it is contemplated that the pressure relief valve may be positioned any place on the conveyor drive roller 10 which does not interfere with its ability to function as a conveyor drive roller while in communication with the inside of the sealed chamber 28, the best location is believed to be on an exterior portion of either the first or second stationary shaft 18, 20. And the most preferred location is believed to be on the second stationary shaft 20, as described above. In both cases, a conduit 40, positioned at least partially (if not entirely) inside the first or second stationary shaft has been found to be an efficient way to provide a flow path for pressurized gas from the inside of the sealed chamber to the pressure relief valve 50 to exit therethrough to the outside of the sealed chamber.

While reference has been made to various preferred embodiments of the invention other variations, implementations, modifications, alterations, and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations, and embodiments, all of which are within the scope of the present invention, which invention is limited only by the appended claims.

The embodiments of the invention in which an exclusive property or privilege is claimed are defined as follows:

1. A conveyor drive roller for a conveyor system, said conveyor drive roller comprising:

a hollow drum rotatably connected to a first stationary shaft and a second stationary shaft, said hollow drum defining a sealed chamber;

said sealed chamber at least partially enclosing means to rotate said hollow drum about said first and second stationary shafts;

a pressure relief valve positioned on said conveyor drive roller in fluid communication with said inside of said sealed chamber, and configured to reduce a gas pressure of a gas inside of said sealed chamber caused by a rise in a temperature of said conveyor drive roller during operation; and a conduit extending from said inside of said sealed chamber to outside of said sealed chamber, said conduit defining an internal portion located in said inside of said sealed chamber, and an external portion located in said outside of said sealed chamber, said external portion being sealed from said outside of said sealed chamber;

wherein:

said internal portion of said conduit defines an opening in fluid communication with said inside of said sealed chamber; and said pressure relief means is sealingly connected to said external portion of said conduit.

2. The conveyor drive roller as claimed in claim 1, wherein said pressure relief valve is configured to allow gas to pass from said inside of said sealed chamber to said outside of said sealed chamber, but blocks liquids and particulate solids from passing from said outside of said sealed chamber to said inside of said sealed chamber.

3. The conveyor drive roller as claimed in claim 2, wherein said pressure relief valve is configured to maintain said gas pressure of the gas in said inside of said sealed chamber in a range of about −1 PSI and 1 PSI.

4. The conveyor drive roller as claimed in claim 3, wherein said pressure relief valve is configured to maintain said gas pressure of the gas in said inside of said sealed chamber in a range of about 0 PSI and 0.6 PSI.

5. The conveyor drive roller as claimed in claim 2, wherein said pressure relief valve is further configured to allow said gas to pass from said outside of said sealed chamber to said inside of said sealed chamber.

6. The conveyor drive roller as claimed in claim 5, wherein said pressure relief valve is a pressure equalization plug.

7. The conveyor drive roller as claimed in claim 1, wherein said conduit is positioned at least partially inside said first or said second stationary shaft.

8. The conveyor drive roller as claimed in claim 7, wherein said conduit is formed in said first or said second stationary shaft.

9. The conveyor drive roller as claimed in claim 1, wherein said means to rotate said hollow drum comprises:

an internal gear assembly disposed inside of said sealed chamber, and operatively connected to said hollow drum, said internal gear assembly being configured to operatively couple to a motor;

wherein when said motor is coupled to said internal gear assembly, operation of said motor causes said rotation of said hollow drum about said first and second stationary shafts.

10. The conveyor drive roller as claimed in claim 9, wherein said motor is an electric motor positioned inside or outside of said hollow drum.

11. The conveyor drive roller as claimed in claim 10, wherein said motor is an electric motor positioned inside of said sealed chamber; and wherein said conduit is further configured to route electrical wiring therethrough for powering said electric motor.

12. The conveyor drive roller as claimed in claim 1, comprising at least one seal for sealing said inside of said sealed chamber from said outside of said sealed chamber.

13. The conveyor drive roller as claimed in claim 12, wherein said at least one seal is an O-ring seal, or a rotary shaft seal.

14. The conveyor drive roller as claimed in claim 1, wherein said first and second stationary shafts are configured for attaching said conveyor drive roller to a frame of said conveyor system.

15. The conveyor drive roller as claimed in claim 14, wherein said conveyor system is configured for moving a conveyor medium.

16. A conveyor drive roller for a conveyor system, said conveyor drive roller comprising:

a hollow drum rotatably connected to a first stationary shaft and a second stationary shaft, said hollow drum defining a sealed chamber;

said sealed chamber at least partially enclosing means to rotate said hollow drum about said first and second stationary shafts; and a pressure relief valve positioned on said conveyor drive roller in fluid communication with said inside of said sealed chamber, and configured to reduce a gas pressure increase inside of said sealed chamber caused by a rise in a temperature of said conveyor drive roller during operation; and wherein said pressure relief valve is positioned on said first stationary shaft or said second stationary shaft.

* * * * *